United States Patent [19]

Kita

[11] Patent Number: 5,288,350
[45] Date of Patent: Feb. 22, 1994

[54] PLASTIC CASE HAVING IMPROVED ULTRASONIC WELDS BETWEEN HALVES THEREOF AND METHOD FOR PRODUCING SAME

[75] Inventor: Akihisa Kita, Kanagawa, Japan

[73] Assignee: Fuji Photo Film Co., Ltd., Kanagawa, Japan

[21] Appl. No.: 8,180

[22] Filed: Jan. 25, 1993

Related U.S. Application Data

[62] Division of Ser. No. 743,617, Aug. 12, 1991, Pat. No. 5,199,593.

[30] Foreign Application Priority Data

Aug. 14, 1990 [JP] Japan ............................ 2-85442[U]
Sep. 11, 1990 [JP] Japan ............................ 2-94736[U]
Oct. 8, 1990 [JP] Japan ........................... 2-105196[U]

[51] Int. Cl.⁵ .......................................... B32B 31/16
[52] U.S. Cl. ................................... 156/73.1; 156/87; 156/293; 264/23
[58] Field of Search ............... 156/73.1, 87, 285, 286, 156/293, 294, 580.1; 264/23, 248

[56] References Cited

U.S. PATENT DOCUMENTS

| | | | |
|---|---|---|---|
| 3,095,112 | 6/1963 | Weinstein et al. | 220/613 |
| 3,432,072 | 3/1969 | Quercia | 220/613 |
| 3,706,393 | 12/1972 | Curtis et al. | 220/613 |
| 4,464,109 | 8/1984 | Giangiulio et al. | 220/613 |
| 4,706,833 | 11/1987 | Korcz et al. | 220/613 |
| 4,886,181 | 12/1989 | Haines | 220/613 |
| 5,115,961 | 5/1992 | Nakajima | 228/111 |
| 5,116,216 | 5/1992 | Cochran et al. | 425/504 |
| 5,205,895 | 4/1993 | Hohman, Jr. et al. | 156/293 |

FOREIGN PATENT DOCUMENTS

WO89/50773 6/1989 PCT Int'l Appl. .................. 220/612

*Primary Examiner*—David A. Simmons
*Assistant Examiner*—J. Sells
*Attorney, Agent, or Firm*—Sughrue, Mion, Zinn, Macpeak & Seas

[57] ABSTRACT

A plastic case and a method for producing a plastic case composed of two halves ultrasonically welded together without problems caused by the generation of excess material, namely, excess melted resin and resin particles, produced during the welding process. The welding is effected at abutting portions of a projection formed on one of the two case halves and a recess formed on the other. A gap is left between the end surface of the distal-face of the projection and the bottom of the recess defining an internal space. At least one air hole is formed communicating with the internal space, and suction may be applied to the internal space through the air hole. Also, a dust-blocking rib may be provided on at least one of the recess and projection surrounding the abutting welding portions.

9 Claims, 7 Drawing Sheets

PLASTIC CASE HAVING IMPROVED ULTRASONIC WELDS BETWEEN HALVES THEREOF AND METHOD FOR PRODUCING SAME

This is a divisional of application Ser. No. 07/743,617 filed Aug. 12, 1991 U.S. Pat. No. 5,199,593.

BACKGROUND OF THE INVENTION

The present invention relates to a plastic case formed by mating upper and lower half cases together and then welding (fusingly bonding) the two half cases together. More particularly, the invention relates to a type of plastic case which is relatively small and accordingly has limited welding spaces available.

In recent years, there have been manufactured a wide variety of products formed from plastic resins. One type of such product is a box-like case containing desired components therein. For example, a plastic case containing a recording medium such as a disk or a tape is used to form a box-like body as in a magnetic disk cartridge, a magneto-optical disk cartridge, and a magnetic tape cassette such as a video tape cassette or an audio tape cassette. This plastic case, although relatively small, is required to have high molding accuracy. The case is formed by mating upper and lower half cases together.

With respect to magnetic tape cassettes, the manner of connecting upper and lower half cases together is disclosed, for example, in Japanese Laid-Open (Kokai) Patent Applications Nos. 37913/72 and 98604/79 and Japanese Laid-Open Utility Model Applications Nos. 102085/82 and 871/89.

In the construction disclosed in the above Japanese Laid-Open Patent Application No. 37913/72, projections are formed on the connection end surface of one of the upper and lower half cases, and these projections are melted by an ultrasonic welding device so as to effect bonding. In the constructions disclosed in the above Japanese Laid-Open Patent Application No. 98604/79 and Japanese Laid-Open Utility Model Application No. 102085/82, projections are formed on the connecting portion of one of the upper and lower cassette halves, and recesses for fitting respectively on the projection are formed in the connection portion of the other. The projections are fitted in respective ones of the recesses to position the upper and lower half cases relative to each other, and then they are welded together with ultrasonic welding device. In the construction disclosed in the above Japanese Laid-Open Utility Model Application No. 871/89, concave and convex fitting portions are welded together, and then are fastened together by screws.

With respect to the plastic cases of this type used in a magnetic tape cassette, from the viewpoint of its productivity, the above publications propose to fix the upper and lower half cases together with ultrasonic welding device. For this purpose, as shown, for example, in FIG. 1, a projection 2a is formed on an end surface of a side wall of an upper half case 2, this upper case is mated with a flat distal face of a lower half case 3, and then the projection 2a is melted. However, the molten resin tends to partially run out from the mating portion thereof to the outside. As shown in FIG. 2, in order to avoid such run-out, a recess 27 is formed in the upper half case 2 while a projection 28 smaller in diameter than the opening of the recess 27 is formed on the lower half case 3, the projection 28 is fitted in the recess 27, and the contact portion between a distal face 29 of the projection 28 and the bottom surface of the recess 27 is welded. However, with this construction, it has been difficult to increase the welding area in an attempt to obtain a connecting force above a certain level. Namely, the welding area depends on the size of the distal face 29, but increasing the distal face 29 imposes a limitation on the internal space of the case. Because little excess internal space is available, it has been difficult to obtain a desired connecting force.

As a result, in the conventional magnetic tape cassettes, more expensive screw-fastened constructions have been extensively used to ensure sufficient strength as not to invite a malfunction over long periods of time.

As is well known, the above ultrasonic welding device applies ultrasonic vibrations of a frequency of about 20 KHz to about 40 KHz to the bonding surfaces while these surfaces are pressed together, whereby the synthetic resin is melted and welded by the strong frictional heat produced by the ultrasonic energy.

With respect to plastic cases of this type used in magnetic tape cassette, from the viewpoint of its productivity, it has been proposed, as discussed in the above publications, to fix the upper and lower half cases together with ultrasonic welding device, and in the case of the ultrasonic welding, constructions such as shown in FIGS. 3 and 4 have been adopted. In the case of FIG. 3, a projection 2a is formed on an distal face of a side wall of an upper half case 2, and this upper half case 2 is mated with a flat distal face of a lower half case 3, and then the projection 2a is melted. In the case of FIG. 4, a recess 27 is formed in an upper half case 2 whereas a projection 28 smaller in diameter than the opening of the recess 27 is formed on a lower half case 3. The projection 28 is fitted in the recess 27, and the region of contact between a distal face 29 of the projection 28 and the bottom surface of the recess 27 is welded.

In both of these constructions, fine particles 70 of the plastics material are produced substantially simultaneously with the welding of the bonding portions. This particles are produced by the abrasion of the bonding portions rubbing against each other as a result of the vibration of the bonding portions. The particles tend to be produced for a very short time period prior to the completion of the welding. If dust such as the fine particles 70 are retained within the case, and if an associated part contained in this case is, for example, a magnetic disk or a magnetic tape, the fine particles will adhere onto the recording surface of such media, resulting in a degradation of the recording and reproducing characteristics, and causing undesired phenomena such as drop-out in its output level.

SUMMARY OF THE INVENTION

Accordingly, it is an object of the invention to provide a plastic case in which upper and lower half cases are connected together with ultrasonic welding device, wherein the bonding strength is higher than that obtained in the conventional ultrasonically welded cassettes, and is such as not to cause a malfunction for long periods of time.

The above object of the invention has been achieved by a plastic case formed by mating upper and lower half cases together and welding them together, wherein projections are formed on one of the upper and lower half cases whereas ribs, each having a recess, are formed on the other in opposed relation to respective ones of the projections, the outer diameter of a distal face of the projection being slightly greater than the inner diameter of the recess, the recess and the projection are abutted against each other, and ultrasonic vibration energy is applied to these abutted portions, so that a welded portion is provided between the inner surface of the recess and the outer surface of the projection and a gap is formed between the bottom of the recess and the distal face of the projection to provide an insertion internal space.

It is another object of the invention to provide a plastic case in which even when upper and lower half cases are connected together with ultrasonic welding device, fine particles, produced during welding can be effectively discharged to the exterior of the case.

The above object of the invention has been achieved with a plastic case formed by mating upper and lower half cases together and by applying ultrasonic vibration energy to abutted portions of the upper and lower half cases to be welded, thereby fixedly welding together the abutted portions, wherein an internal space is formed in the inside of the abutted portions, at least one air hole communicated with the internal space is formed in the abutted portions, and the abutted portions are welded together while suction is applied through the air hole during the welding operation.

It is still another object of the invention to provide a plastic case in which when upper and lower half cases are connected together with ultrasonic welding device, fine particles produced during welding are prevented from intruding into the interior of the case.

The above object of the invention has been achieved with a plastic case formed by mating upper and lower half cases together and by applying ultrasonic vibration energy to abutted portions of the upper and lower half cases to be welded, thereby fixedly welding said abutted portions together, wherein the abutted portions are formed respectively by a recess and a projection, and the outer diameter of said projection is slightly greater than the inner diameter of the recess so that the recess and the projection disposed in opposed relation to each other can form welding portions, and a dust-blocking rib is provided on one of the recess and the projection at a position surrounding the welding portions of the abutted portions, whereas an opposed wall portion which can generally contact the dust-blocking rib is provided on the other. When the upper and lower half cases are to be welded together, at least the interior space of the case and the welding portions are generally isolated from each other by the dust-blocking rib and the opposed wall portion before the distal faces of the welding portions are brought into contact with each other.

DESCRIPTION OF THE PREFERRED EMBODIMENTS

Preferred embodiments of the present invention will now be described with reference to the accompanying drawings.

Figure 1:
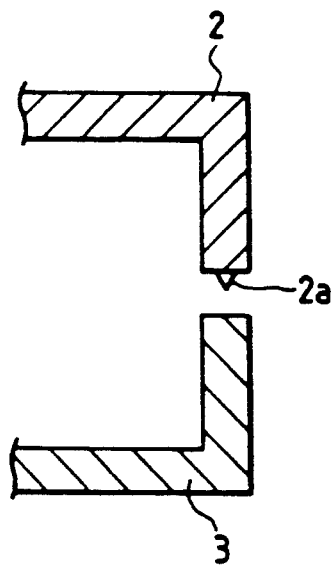
FIGS. 1 and 2 are schematic cross-sectional views of respective conventional welding constructions.
Figure 2:
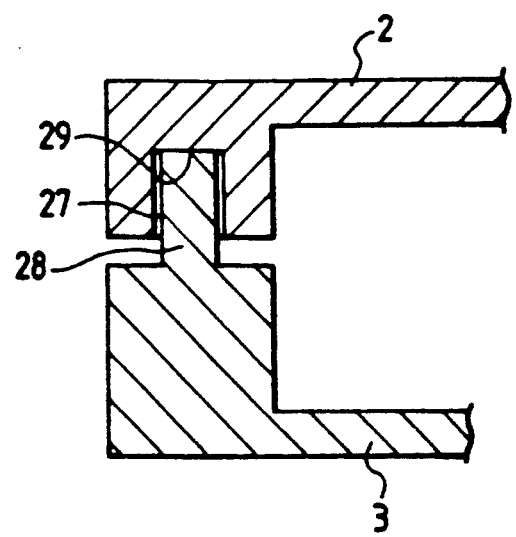
Figure 3:
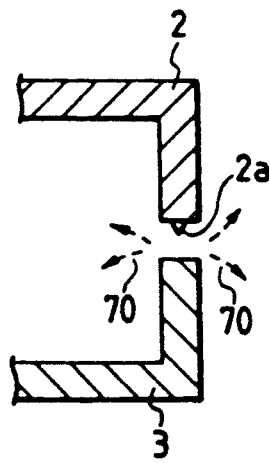
FIGS. 3 and 4 are schematic cross-sectional views of conventional welding constructions for a discussion of problems associated with the production of a fine particles during an ultrasonic welding operation.
Figure 4:
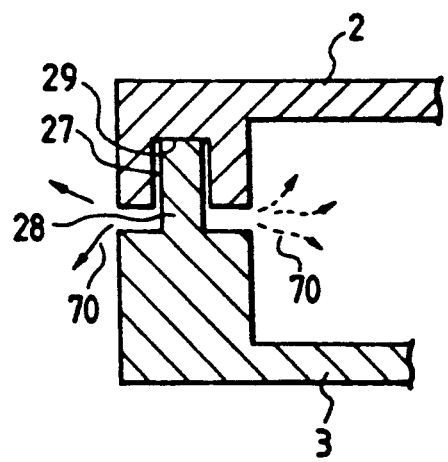
Figure 5:
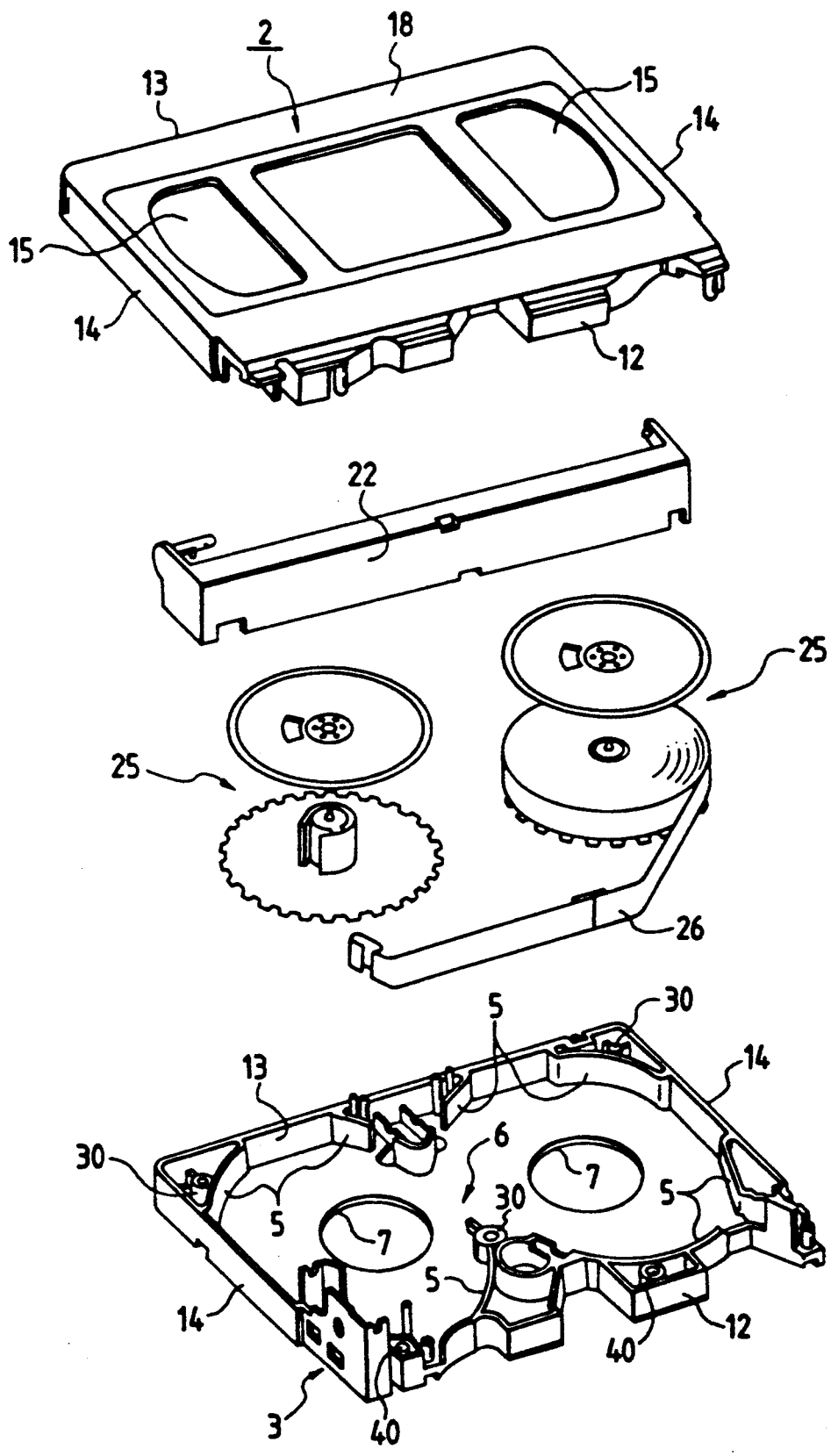
FIG. 5 is a schematic exploded perspective view of a magnetic tape cassette for a VHS-type VTR provided in accordance with the present invention.
Figure 6:
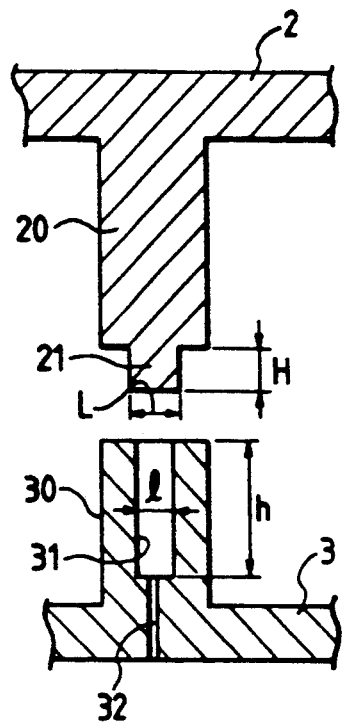
FIGS. 6 to 8 are schematic cross-sectional views of respective welded portions of the cassette of FIG. 5.
Figure 7:
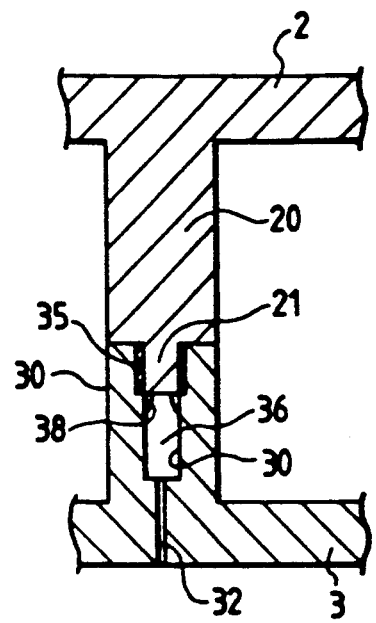
Figure 8:
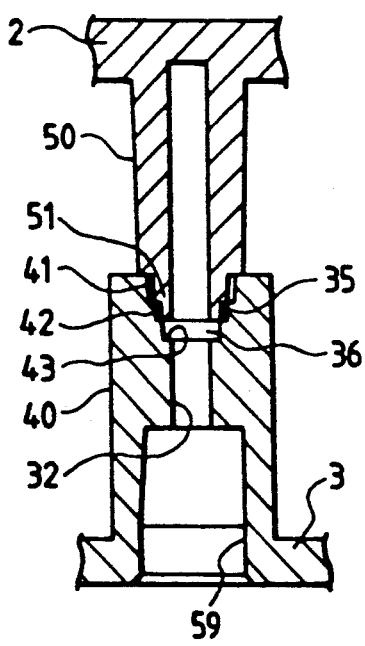
Figure 9:
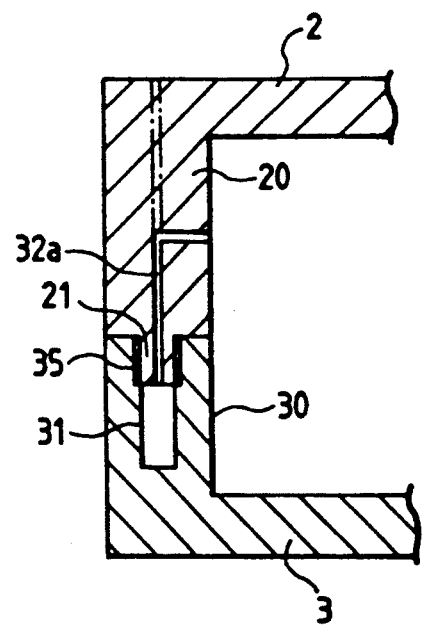
FIG. 9 is a cross-sectional view of an important portion of another embodiment of the invention.
Figure 10:
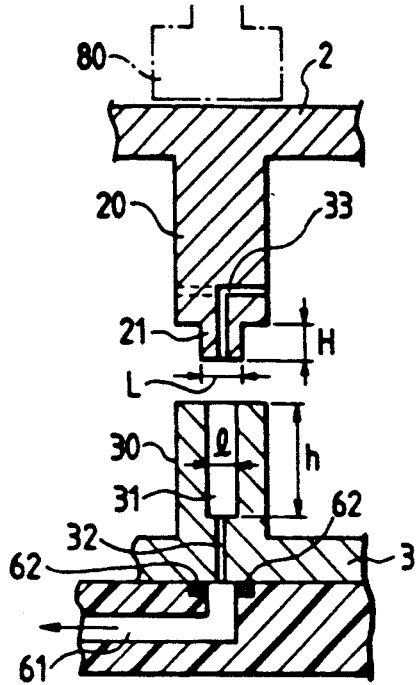
FIGS. 10 to 12 are schematic cross-sectional views of welded portions in a further embodiment of the invention.

FIG. 5 is a schematic exploded perspective view of a magnetic tape cassette, such as may be used for a VHS-type VTR, produced in accordance with the present invention. FIGS. 6 to 8 are schematic cross-sectional views of welded portions, and FIG. 9 is a cross-sectional view of an important portion of another embodiment of the invention.

As is well known, in a VTR tape cassette, tape reels 25 having a magnetic tape 26 wound thereon are received within a cassette case composed of an upper half case 2 and a lower half case 3. A tape-withdrawal opening at the front side of the cassette case is covered with a guard panel 22. (Other conventional parts are omitted for the sake of convenience in description).

The upper half case 2 has a box-like shape having front and rear side walls 12 and 13 and right and left side walls 14 and 14 which are formed perpendicularly on a peripheral edge portion of a rectangular upper wall 18 having window openings 15. This upper half case 2 is integrally molded by injection molding or the like, and transparent window members are welded to the window openings 15. Leaf springs for urging the tape reels 25 toward the lower side of the cassette are fixedly mounted on the central portion of the inner surface of the upper wall.

The lower half case 3 has a box-like shape having front and rear side walls 12 and 13 and right and left side walls 14 and 14 which are formed perpendicularly on a peripheral edge portion of a rectangular bottom wall 6. Shaft insertion holes 7 for inserting drive shafts of a recording and reproducing device into reel hubs of the tape reels 25 are formed through the bottom wall 6. The position of each tape reel 25 in a cassette horizontal direction is limited by partition walls 5 which are formed perpendicularly on the upper wall 18 and the bottom wall 6 and are arranged in a generally circular configuration in surrounding relation to the tape reel.

Each of the upper and lower half cases 2 and 3 is integrally molded of a synthetic resin such as an ABS resin, and with respect to those portions which are conventionally fastened together by screws, projections 20 are formed on the upper half case 2 whereas ribs 30 are formed on the lower half case 3 in opposed relation to the projections 20, respectively, as shown in FIG. 6. A recess 31 is formed in the rib 30. An outer diameter L of a distal face 21 of the projection 20 is slightly greater than an inner diameter 1 of the recess 31.

In a final stage of the assembly of the cassette, the and lower half cases 2 and 3 are mated together in such a manner that the recess 31 and the projection 20 are forcedly abutted against each other, and ultrasonic vibration energy is applied to the abutted portions to produce frictional heat by which the contacted portions are melted. As a result, as shown in FIG. 7, the distal face 21 is forcedly inserted into the recess 31 and the outer peripheral portion of the distal face 21 and the inner peripheral portion of the recess 31 are melted to provide a welded portion 35, thus completing the welding operation. Since the height H of the distal face 21 is smaller than the depth h of the recess 31, an insertion internal space 36 is formed by the gap between the bottom of the recess 31 and the distal face 21. Therefore, an excess portion 38, resulting from the excess of the molten resin of the welded portion 35, is formed in the insertion internal space 36. An air hole 32, communicated with the insertion internal space 36, is formed in the rib 30.

Thus, since the outer diameter L of the distal face 21 is slightly greater than the inner diameter l of the recess 31, the larger section of the distal face 21 (conversely, the smaller section of the recess) can constitute a welding section, and the size of this welding section can be suitably adjusted in a certain range. The welding section can be increased in the direction of thickness of the cassette, as compared with conventional flat bonding and therefore the welding strength can be increased. Also, the bonding strength provided by this welding section greatly depends on the area of the welded portion, and is determined by the diameter of the distal face 21 and the depth of fitting of the distal face 21 into the recess 31.

Due to the provision of the insertion internal space 36, the molten excess resin 38 can be accommodated within this space, and undesirable run-out of the resin is prevented. If the insertion internal space 36 is sufficiently larger than the amount of the excess resin 38, run-out can be avoided only by the insertion internal space 36. On the other hand, if the insertion internal space 36 cannot be made sufficiently large due to the provision of a larger welding section, the air hole 32 can compensate for the size of the insertion internal space. That is, due to the provision of the air hole 32 communicated with the insertion internal space 36, the pressure within the insertion internal space 36 will not be increased by the resin gas, the heated air, etc., produced during welding, and therefore the excess welding resin is effectively allowed to flow into the insertion internal space 36, preventing run-out of the welding resin to the outside.

In another embodiment as shown in FIG. 8, ribs 40 are formed on the lower half case 3 at the front portion of the cassette, and projections 50 for fitting forcedly respectively in the ribs 40 are formed on the upper half case 2. The rib 40 is disposed in surrounding relation to a positioning hole 59 into which a positioning element, such as a positioning pin, is to be inserted when the cassette case is loaded into the recording and reproducing device.

A stepped recess 41 is formed in the rib 40, and an air hole 32 for the stepped recess 41, which also serves as a positioning hole, communicates with the positioning hole 59. An outer peripheral portion of a distal face 51 of the projection 50 is formed into a tapered, stepped configuration corresponding to the shape of the stepped recess 41. The stepped distal face 51 is inserted as far as a central step portion 42 of the recess 41 so as to provide a welded portion 35. Since a step portion 43 is formed between the air hole 32 and the recess 41, the resin melted during the welding will not flow into the positioning hole 59.

In the above embodiment, although the air hole 32 is provided at that side where the recess 31 is provided, an air hole 32a, communicated with the interior of the case, may be provided at that side where the projection 20 is provided, as shown in FIG. 9. Also, the air hole 32a may be communicated with the exterior of the case as shown in phantom.

In the present invention, the positional relation between the recess 31 and the projection 20 in the above embodiment may of course be reversed.

In the above embodiment although the recess 31 is formed in the rib 30, the present invention is not limited to such a construction, and the recess may be formed in the side wall (including the corner portion of the case) of the cassette case.

As described above, in the present invention, projections are formed on one of the upper and lower half cases, whereas ribs each having a recess are formed on the other in opposed relation to the projections, and the outer diameter of the distal face of the projection is slightly greater than the inner diameter of the recess. With this construction, by the use of ultrasonic vibration energy for fastening the upper and lower half cases together, the larger section of the projection in contact with the edge portion of the recess is melted to provide the welding section. Therefore, this larger section of the projection serves as the welding section, and by increasing this welding section, the welding strength can be increased. Further, since the welding section can be provided in the direction of the thickness of the case, the welding section can be increased even if the increased welding section cannot be provided in the lateral direction, as a result of which the welding strength can be increased.

Further, when the projection is inserted into and welded to the recess, an insertion internal space is formed with the gap between the bottom of the recess and the distal face of the projection, and also an air hole communicated with the insertion internal space is provided. Therefore, the insertion internal space receives the excess resin running out during the welding, and also the resin gas and heated air can be discharged through the air hole. Thus, the excess welding resin can be effectively received by the insertion internal space, and the flow of the welding resin to the exterior can be prevented.

According to the present invention, there is provided a plastic case in which when fastening the upper and lower half cases together with ultrasonic welding device, run-out of the welding resin is satisfactorily prevented, and the bonding strength thereof is higher than that of the conventionally achieved one. Also, there is obtained such a sufficient bonding strength so as to prevent malfunctions for a long period of time.

A further embodiment of the invention will now be described with reference to FIGS. 10 through 15 of the attached drawings.

Figure 11:
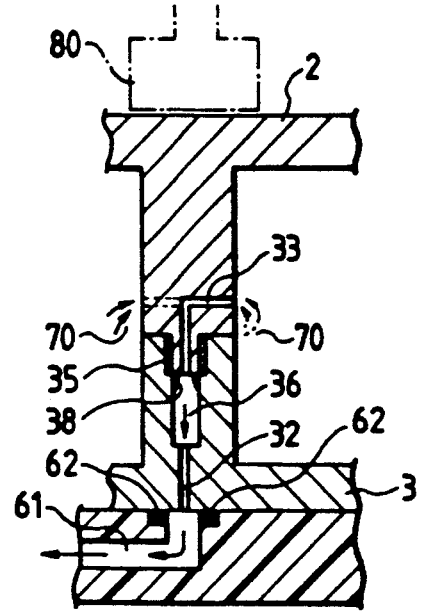
Figure 12:
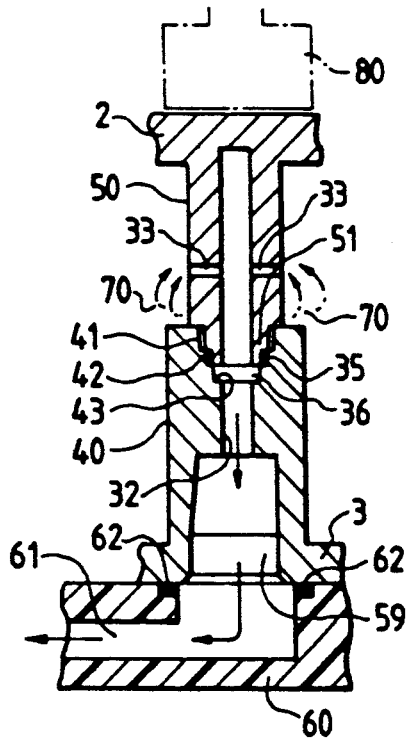

As explained above, in a final stage of the assembly of the cassette shown in FIG. 5, the upper and lower half cases 2 and 3 are mated together in such a manner that the recesses 31 and the projection 20 are forcedly abutted against each other and are welded together. For carrying out this welding, the cassette case is held between a welding horn 80 arranged against the upper side of the upper half case 2, and a support bed 60 supporting the lower side of the lower half case 3, and ultrasonic vibration energy is applied from the welding horn 80 through the projection 20 to the abutted portions. At the same time a suction hole 61 in the support bed 60 is connected to the air hole 32, and suction is applied to it with a suction device (not shown). Therefore, frictional heat develops at the abutted portions, so that the contacted portions are melted. As shown in FIG. 11, the outer peripheral portion of the distal face 21 and the inner peripheral portion of the recess 31 are melted to provide a welded portion 35, thereby completing the welding.

During this operation, since air is drawn through the suction hole 61, fine particles 70 of the resin produced at the initial stage of the welding operation are drawn directly into the internal space 36, and the fine particles, once introduced into the interior of the case, is drawn through the air hole 33.

In order to enhance the seal between the suction hole 61 and the air hole 32, a suitable seal member 62 made of an elastic material or the like may be provided around the outer periphery of the opening of the suction hole 61.

If the internal space 36 is made relatively large, an excess portion 38 of the molten resin at the welded portion 35 can be effectively drawn into the internal space 36.

Thus, by applying suction through the air hole 32, the fine particles 70 produced during the ultrasonic vibration welding operation can be discharged to the exterior of the case quite effectively. Further, since the excess portion 38 will not flow to the outer side of the bonded portion, the outer diameter of the bonded portion will not be changed by the welding operation, and also even if the welded portion is disposed adjacent the outer surface of the case, the appearance of the cassette will not be affected by the weld.

In this embodiment, ribs 40 are formed on the lower half case 3 at the front portion of the cassette, and projections 50 for fitting respectively in the ribs 40 are formed on the upper half case 2. An air hole 33, as in the projection 20, communicating an internal space 36 with the interior of the case, is formed in the projection 50. The rib 40 is disposed in surrounding relation to a positioning hole 59 into which a positioning member, such as a positioning pin, is inserted when the cassette case is loaded into the recording and reproducing device.

A stepped recess 41 is formed in the rib 40, and an air hole 32 for the stepped recess 41 which also serves as a positioning hole, communicates with the positioning hole 59. Therefore, the opening of the suction hole 61 formed in the support bed 60 is formed into a large size corresponding to that of the positioning hole 59. A distal face 51 of the projection 50 is formed in a tapered, stepped configuration corresponding to the shape of the stepped recess 41. The stepped distal face 51 is inserted as far as a central step portion 42 of the recess 41 so as to provide a welded portion 35. Since a step portion 43 is formed between the air hole 32 and the recess 41, the resin melted during the welding operation will not flow into the positioning hole 59.

In the present invention, the positional relation between the recess 31 and the projection 20 in the above embodiment of course may be reversed.

Figure 13:
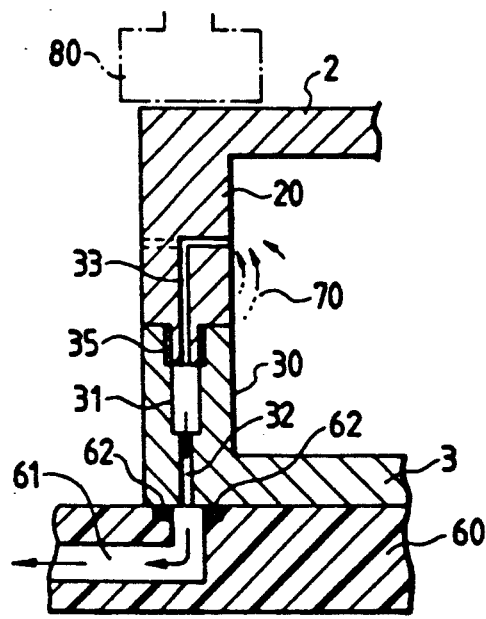
FIGS. 13 to 15 are cross-sectional views of important portions of still further embodiments of the invention.

In the above embodiment, although the welded portions are disposed at the inner portions of the cassette case, the present invention is not limited to such a construction, and as shown in FIG. 13, the recess 31 may be formed in the side wall (including the corner portion of the case) of the cassette case. Also, the air hole 33 may not be communicated with the interior of the case, but may open to the outer surface of the case, as shown in phantom.

Figure 14:
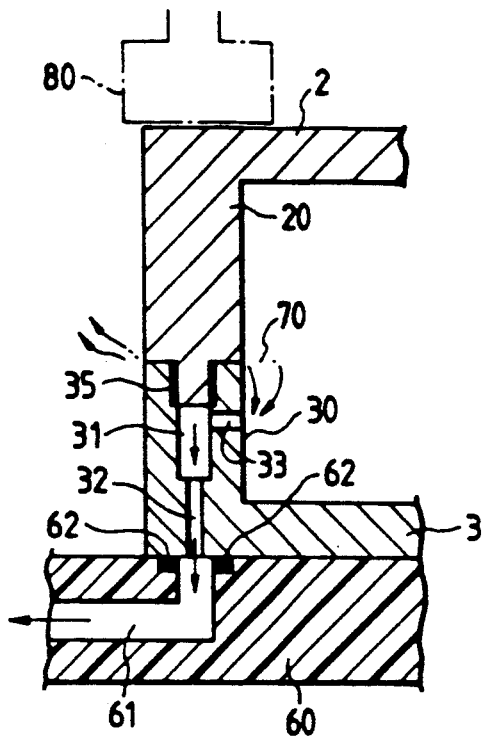

Further, in the present invention, as shown in FIG. 14, the air hole 33 communicated with the interior of the case, as well as the air hole 32 communicated with the suction hole 61, may be formed in the rib 30 of the lower half case 3.

Figure 15:
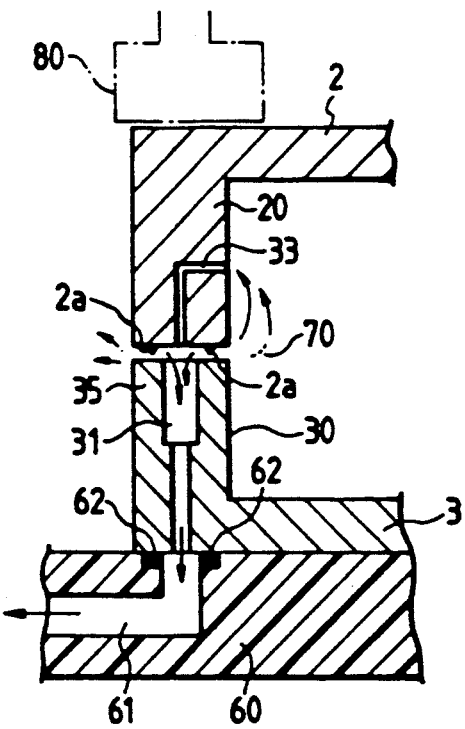

In the above embodiment, although the welded portion 35 extends in the direction of the thickness of the case, there may be adopted an arrangement, as shown in FIG. 15, in which projections 2a are formed on a distal face of a projection 20, and the distal faces of the projection 20 and a rib 30 are bonded together.

As described above, in the present invention, the air hole is formed in the abutted portions to be welded together by ultrasonic vibration welding, and suctioning is carried out through this air hole during the welding operation. Therefore, fine particles of the resin, produced at the initial stage of the welding of the abutted portions, can be drawn out through the above air hole, and the fine particles produced by vibrating the abutted portions can be discharged to the exterior of the case quite effectively, so that the interior of the case can be kept clean.

By the provision of the gap or internal space in the abutted portions, the excess portion of the molten resin at the welded portion can be effectively drawn into the above internal space. Therefore, the outer dimensions of the bonded portions are not changed by the welding operation, and when the welded portion is disposed adjacent the outer surface of the case, a plastic case can be produced in which run-out of the welding resin cannot be viewed from the exterior.

Another embodiment of the invention will subsequently be described with reference to FIGS. 16 through 24 of the accompanying drawings.

Figure 16:
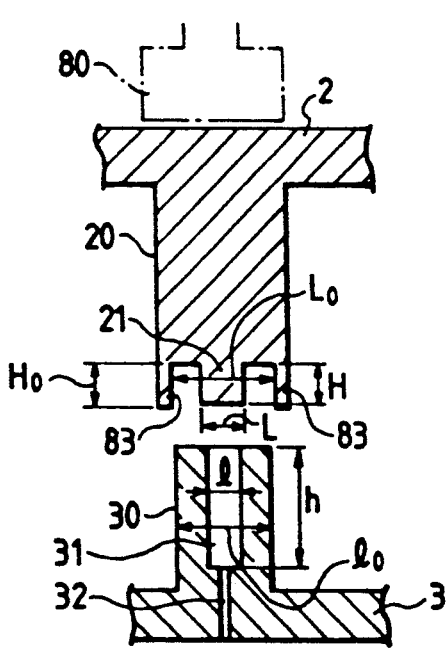
FIGS. 16 to 19 are schematic cross-sectional views of welded portions of the magnetic tape cassette of yet another embodiment of the invention.

In this embodiment, a recess 31 is formed in the rib 30, as in the above-described embodiments. An air hole 32 communicating the recess 31 with the exterior of the case is formed in the rib 30. Further, as seen in FIG. 16, an annular dust-blocking rib 83 is formed on the projection 20 in surrounding relation to its distal face 21, and is projected beyond the distal face 21 (the dimensional relation is $H < H_0$).

The outer diameter L of the distal face 21 of the projection 20 is slightly greater than the inner diameter l of the recess 31. The inner diameter $L_0$ of the dust blocking rib 83 is slightly greater than the outer diameter $l_0$ of the rib 30 so as to avoid strong contact between the two when carrying out the welding operation.

Figure 17:
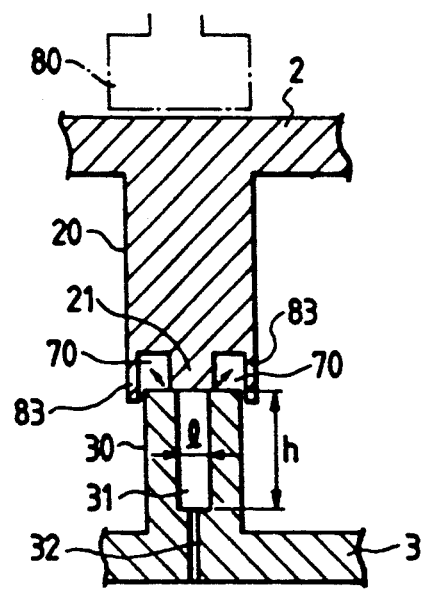
Figure 18:
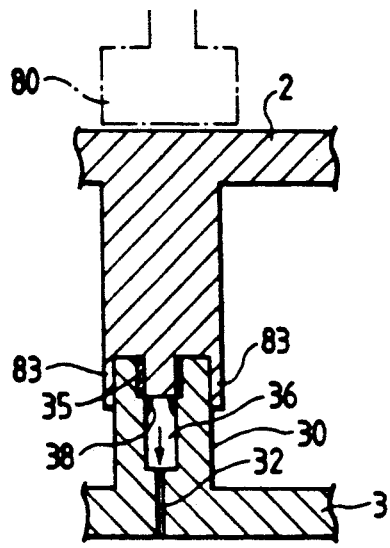

In a final stage of assembling the cassette, the upper and lower half cases 2 and 3 are mated together in such a manner that the recess 31 and the projection 20 are abutted against each other and are welded together. For carrying out the welding operation, the cassette case is held between a welding horn 80, arranged against the upper side of the upper half case 2, and a support bed (not shown) held against the lower side of the lower half case 3, and ultrasonic vibration energy is applied from the welding horn 80 through the projection 20 to the above abutted portions. Frictional heat develops at the abutted portions, so that the contacted portions are melted, and as shown in FIG. 17, the outer peripheral portion of the distal face 21 and the inner peripheral portion of the recess 31 are melted to provide a welded portion 35. Thereby completing the welding operation.

At this welding step, the dust-blocking rib 83 is positioned so as to cover the outer peripheral surface of the rib 30 before the distal face 21 is brought into contact with the upper surface of the rib 30. As a result, even if fine particles 70 are produced by the abrasion caused by the application of the ultrasonic vibration energy, the fine particles 70 is prevented by the dust-blocking rib 83 from intruding into the interior 90 of the case. At the time of the welding operation, the dust-blocking rib 83 is disposed very close to the outer peripheral surface of the rib 30, but is not pressed in close contact therewith, unlike the above abutted portions. Therefore, frictional heat will not be produced at the contact portion of the dust-blocking rib 83.

After welding is completed, an internal space 36 is formed by the recess 31, which is deeper than the amount of insertion of the distal face 21. An excess portion 38 of the welding resin melted by the above welding can flow into the internal space 36.

Due to the provision of the air hole 32 communicating the internal space 36 with the exterior of the case, the increase of the pressure within the internal space 36 due to the heat generated during welding can be avoided, which enables an effective flow of the excess portion 38 of the welding resin into the internal space.

Moreover, if the internal space 36 is made relatively large, the excess portion 38 can be sufficiently received by the internal space 36 without the provision of the air hole 32.

Thus, fine particles 70 produced during the ultrasonic welding operation are effectively prevented by the dust-blocking rib 83 from intruding into the interior 90 of the case. Further, due to the provision of the internal space 36, the excess portion 38 of the welding resin will not flow to the outside of the bonded portions, and therefore the outer diameter of the bonded portions will not be changed by the welding. Thus, if the welded portion is disposed adjacent to the outer surface of the case, the appearance of the cassette will not be affected by the welding.

Figure 19:
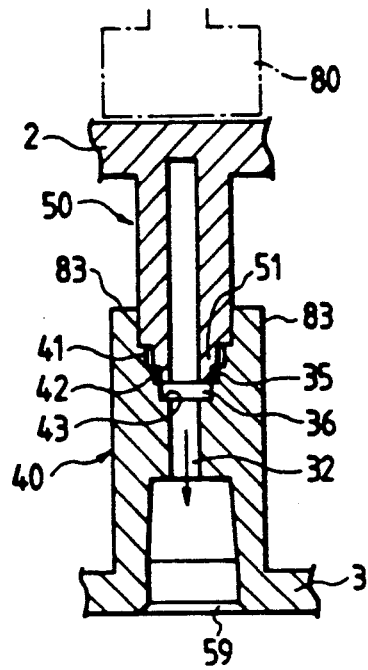

In this embodiment, as shown in FIG. 19, ribs 40 are formed on the lower half case 3 at the front portion of the cassette. As shown in FIG. 19, projections 50 for fitting respectively in the ribs 40 are formed on the upper half case 2. A dust-blocking rib 83 is formed on the rib 40 in corresponding and surrounding relation to the outer peripheral surface of the projection 50. The rib 40 is disposed in surrounding relation to a positioning hole 59 into which a positioning member, such as a positioning pin, is inserted when the cassette case is loaded into the recording and reproducing device.

A stepped recess 41 is formed in the rib 40, and an air hole 32 for the stepped recess 41 also serves as a positioning hole communicated with the positioning hole 59. A distal face 51 of the projection 50 is formed into a tapered, stepped configuration corresponding to the shape of the stepped recess 41. The greatest-diameter portion of this stepped distal face is adapted to be fitted into the dust-blocking rib 83. At the time of the welding, the stepped distal face 51 is inserted as far as a central step portion 42 of the recess 41 in such a manner that the interior 90 of the case is isolated by the dust blocking rib 83 from the portions to be welded, and a welded portion 35 is formed.

Since a step portion 43 is formed between the air hole 32 and the recess 41, the resin melted during the welding will not flow into the positioning hole 59.

Figure 20:
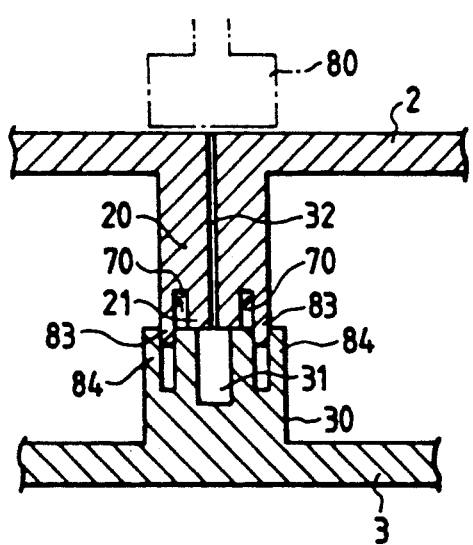
FIGS. 20 to 24 are cross-sectional views of important portions of other embodiments of the invention.
Figure 21:
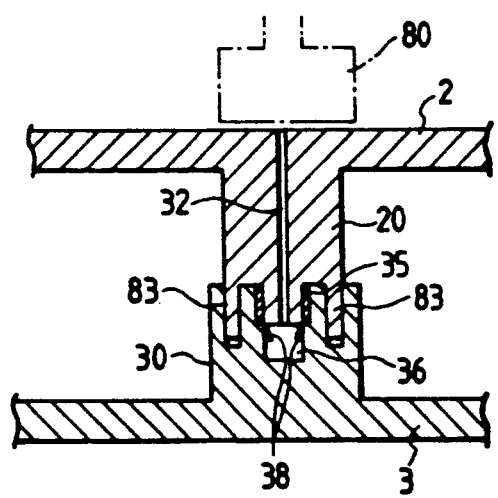

In the above embodiment, although the single annular dust-blocking rib 83 is formed, the present invention is not limited to this precise arrangement. For example, as shown in FIGS. 20 and 21, another dust blocking rib 84 may be provided outwardly of the dust blocking rib 83. By providing plural dust blocking ribs in this manner, the dust blocking effect can be further enhanced.

Figure 22:
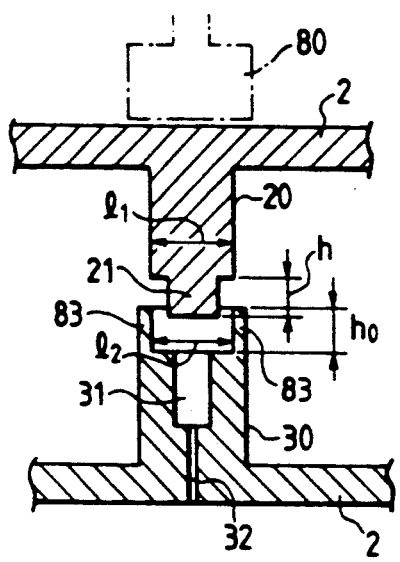
Figure 23:
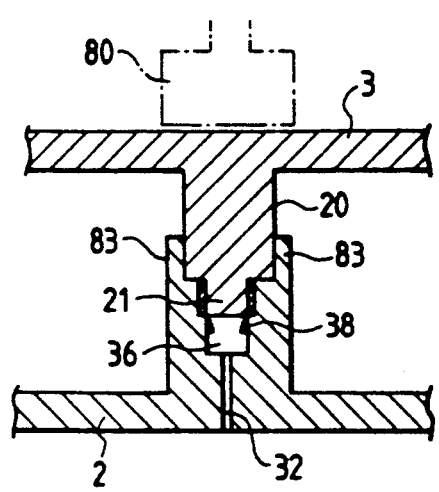

Further, in the present invention, a welded portion may be constructed as shown in FIGS. 22 and 23 wherein a distal face 21 of a projection 20 and its endmost portion are fitted in a two-step recess 31 formed in a rib 30. More specifically, the depth $h_0$ of the upper portion of the recess 31 is greater than the height h of the distal face 21, and the inner diameter $l_2$ of the recess 31 is slightly greater than the outer diameter $l_1$ of the distal face 21.

In this embodiment of the present invention also, the positional relation between the recess 31 and the projection 20 in the above embodiment of course may be reversed.

Figure 24:
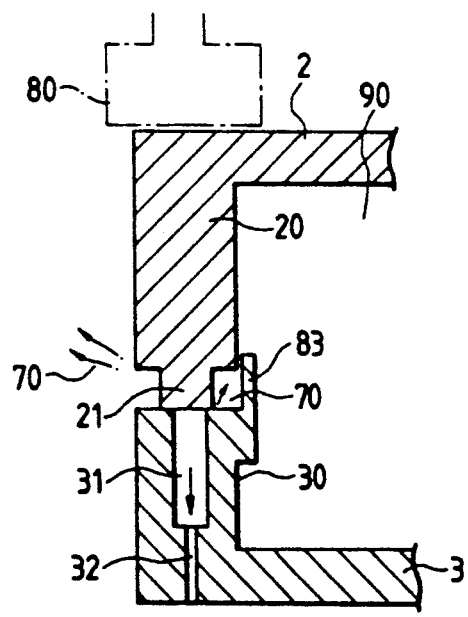

In the above embodiment, although the welded portions are disposed at the inner portions of the cassette case, the present invention is not limited to such a construction, and as shown in FIG. 24, the recess 31 may be formed in the side wall (including the corner portion of the case) of the cassette case. In this case, a dust blocking rib 83 is suitably formed only at that portion directed toward the interior 90 of the case, thereby preventing fine particles 70 from intruding into the case interior 90.

As described above, in the present invention, a dust-blocking rib is provided at the abutted portions to be welded together with ultrasonic vibration welding, which rib isolates the welding portion from the interior of the case before dust can be produced during the welding operation. Therefore, the fine particles of the resin, produced at the initial stage of the welding of the abutted portions, is prevented from intruding into the interior 90 of the case, so that the interior 90 of the case is kept clean.

By the provision of the gap or internal space in the abutted portions, the excess portion of the molten resin at the welded portion can be effectively guided to the above internal space. Therefore, the outer dimensions of the bonded portions are not changed by the welding operation, and even if the welded portion is disposed adjacent the outer surface of the case, there can be provided a plastic case in which the run-out of the welding resin cannot be viewed from the exterior.

In all of the above embodiments, although a magnetic tape cassette for the VHS-type VTR has been described, the present invention is not limited to such a cassette, and the invention can be applied to a magnetic tape cassette for a βtype VTR, a magnetic tape cassette for an 8 mm video or audio tape cassette. The invention can also be most suitably applied particularly to a small and lightweight case such as a magnetic disk cartridge and a magneto-optic disk cartridge, or to any other plastic case.

What is claimed is:

1. A method for producing a plastic case comprising the steps of:
   providing two case halves, one of said case halves having a projection formed thereon, and the other of said case halves having a recess formed for receiving a distal face of said projection, said projection having a diameter slightly greater than the diameter of said recess, a gap being formed between the bottom of said recess and an end face of said distal face of said projection when said projection is inserted into said recess defining an internal space, and at least one air hole is provided in at least one of said projection and recess communicating with said internal space;

assembling said two case halves with said distal face of said projection received in and abutting said recess;

applying ultrasonic vibration energy to abutting portions of said projection and recess to weld said projection to said recess; and simultaneously with said step of applying ultrasonic vibration energy, applying suction to said air hole to apply suction to said internal space to thereby draw out through said air hole particulate material formed during welding of said projection and recess.

2. The method of claim 1, wherein there are provided two air holes communicating with said internal space, said suction being applied to one of said two air holes.

3. The method of claim 2, wherein the other of said air holes communicates with the interior of said case.

4. The method of claim 2, wherein the other of said air holes communicates with the exterior of said case.

5. The method of claim 2, wherein one of said air holes is formed in said projection and the other in said recess.

6. The method of claim 2, wherein both of said air holes are formed in one of said projection and said recess.

7. The method of claim 1, wherein said recess is formed in a rib.

8. The method of claim 1, wherein said recess is formed in a side of said other half of said case.

9. The method of claim 8, wherein a positioning hole is formed in said rib at a side thereof opposite said projection, and said air hole is formed through said projection communicating said internal space to said positioning hole.

* * * * *